(12) United States Patent
Suganuma et al.

(10) Patent No.: US 11,821,849 B2
(45) Date of Patent: Nov. 21, 2023

(54) DEFECTIVE PRODUCT DETERMINATION METHOD FOR VEHICLE WHEEL, NON-TRANSITORY STORAGE MEDIUM, AND DEFECTIVE PRODUCT DETERMINATION DEVICE FOR VEHICLE WHEEL

(71) Applicant: CENTRAL MOTOR WHEEL CO., LTD., Anjo (JP)

(72) Inventors: Morio Suganuma, Toyota (JP); Akira Sakakibara, Toyota (JP); Jürgen Schlesinger, Langen (DE); Andreas Niehues, Wiesbaden (DE)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 0 days.

(21) Appl. No.: 17/690,622

(22) Filed: Mar. 9, 2022

(65) Prior Publication Data
US 2022/0291141 A1 Sep. 15, 2022

(30) Foreign Application Priority Data
Mar. 10, 2021 (JP) .................. 2021-038286

(51) Int. Cl.
*G01N 21/952* (2006.01)
*G01B 11/14* (2006.01)
(Continued)

(52) U.S. Cl.
CPC .......... *G01N 21/952* (2013.01); *G01B 11/14* (2013.01); *G01B 11/24* (2013.01); *G01N 21/9515* (2013.01)

(58) Field of Classification Search
CPC ...... G01B 5/0037; G01B 11/14; G01B 11/16; G01B 11/22; G01B 11/24; G01B 11/28;
(Continued)

(56) References Cited

U.S. PATENT DOCUMENTS 7,657,082 B2 * 2/2010 Kubo .................. B23K 9/1274
228/101
7,783,100 B2 * 8/2010 Byington ............... G01B 11/25
382/152
(Continued)

FOREIGN PATENT DOCUMENTS

| CN | 111665253 A | * | 9/2020 |
| JP | H0562301 U | * | 8/1993 |
| JP | H05-329671 A | | 12/1993 |
| JP | H05329672 A | * | 12/1993 |
| JP | 2004184133 A | * | 7/2004 |
| JP | 2006275536 A | * | 10/2006 |
| JP | 2009276250 A | * | 11/2009 |

(Continued)

*Primary Examiner* — Gordon J Stock, Jr.
(74) *Attorney, Agent, or Firm* — Oliff PLC

(57) ABSTRACT

A defective product determination method for a vehicle wheel includes: locating, as a locating step by a controller, a lowest point on a welding mark due to radiation of a laser beam within a target range from an inner peripheral surface of a wheel rim to a position spaced away by a specified distance inward in a radial direction of the vehicle wheel; and determining, as a determination step by the controller, that the vehicle wheel is a defective product when a defective product determination condition is satisfied. The defective product determination condition includes, as a necessary condition, a condition that a relative distance of the lowest point with respect to the inner peripheral surface of the wheel rim in the radial direction of the vehicle wheel is equal to or smaller than a reference distance.

7 Claims, 8 Drawing Sheets

(51) Int. Cl.
*G01N 21/95* (2006.01)
*G01B 11/24* (2006.01)

(58) Field of Classification Search
CPC ..... G01B 11/285; G01B 11/30; G01B 11/303; G01B 11/306; B23K 31/12; B23K 31/125; B23K 26/02; B23K 26/03; B23K 26/032; B23K 26/044; B23K 9/095; B23K 9/0953; B23K 9/0956; B23K 9/127; B23K 9/1272; B23K 9/1274; G01M 17/013; G01M 17/02; G01M 17/027; G01M 3/38; G01N 21/88; G01N 21/9515; G01N 21/952; G01N 21/956; G01N 21/95684; G01N 2021/8918

See application file for complete search history.

(56) References Cited

U.S. PATENT DOCUMENTS

| | | | | |
|---|---|---|---|---|
| 2006/0157533 A1* | 7/2006 | Onoue | ............... | B23K 9/095 |
| | | | | 228/8 |
| 2008/0190901 A1* | 8/2008 | Caprioglio | ............. | B60B 31/00 |
| | | | | 219/121.64 |
| 2021/0387472 A1* | 12/2021 | Suganuma | ............. | B60B 3/044 |

FOREIGN PATENT DOCUMENTS

| | | | | |
|---|---|---|---|---|
| JP | 4486782 | B2 * | 6/2010 | |
| JP | 2010256326 | A * | 11/2010 | |
| JP | 2020046302 | A * | 3/2020 | |
| KR | 20000072236 | A * | 12/2000 | |
| KR | 20080012614 | A * | 2/2008 | |
| WO | WO-2020059202 | A1 * | 3/2020 | |

\* cited by examiner

FIG. 7
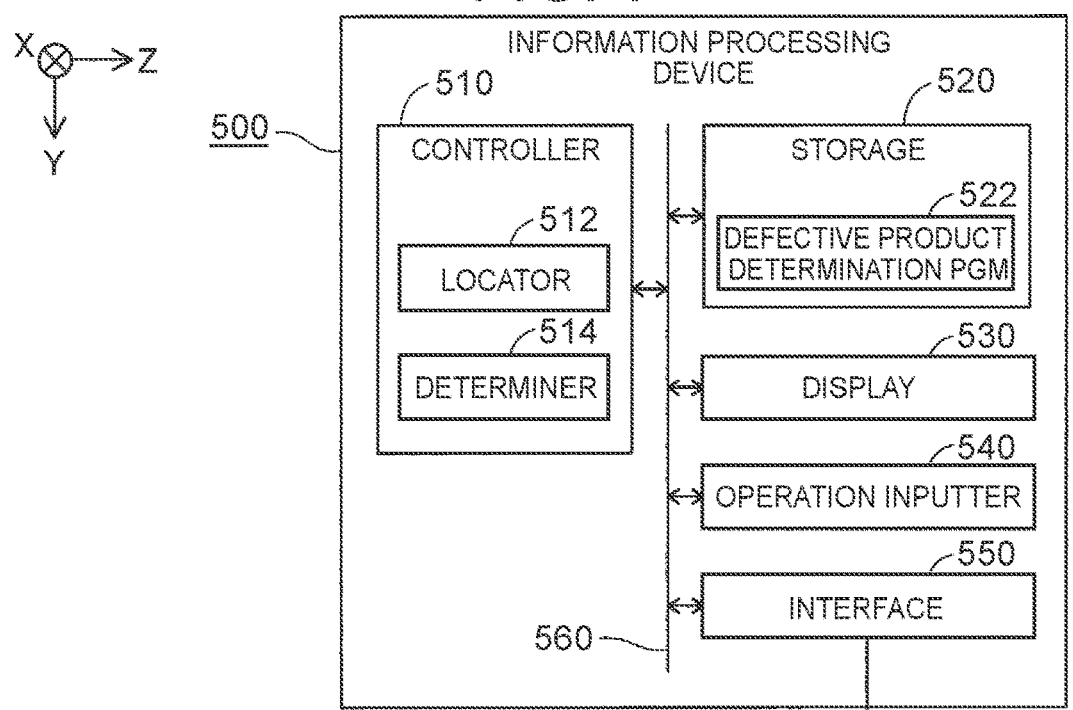
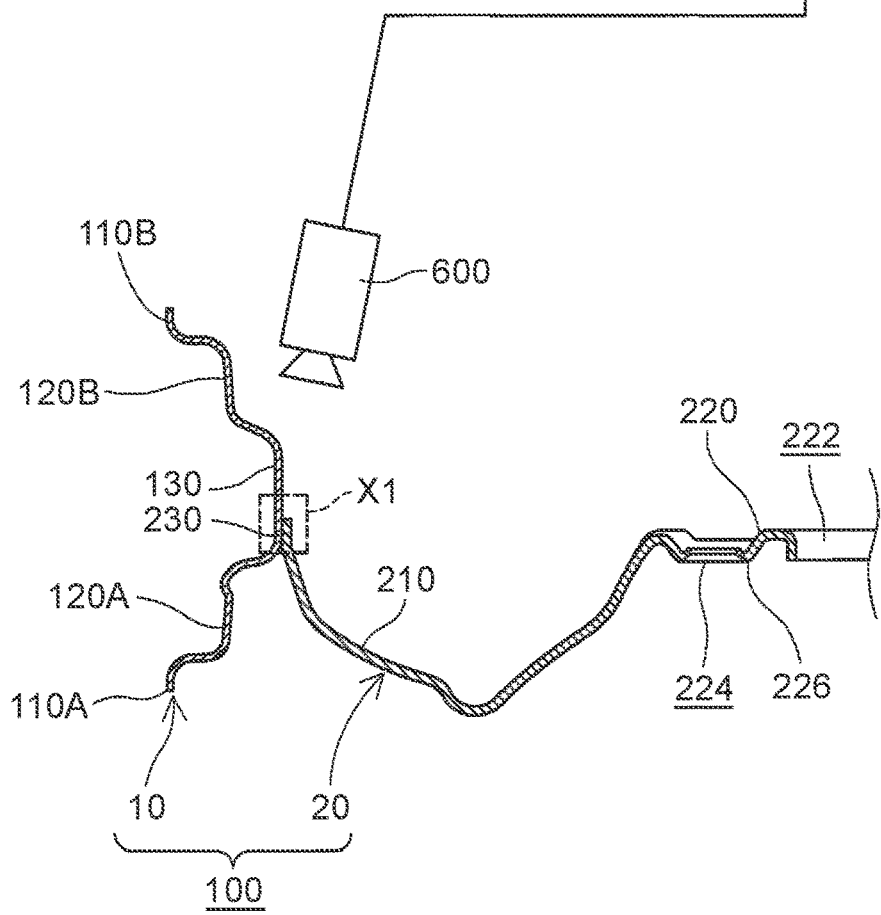

DEFECTIVE PRODUCT DETERMINATION METHOD FOR VEHICLE WHEEL, NON-TRANSITORY STORAGE MEDIUM, AND DEFECTIVE PRODUCT DETERMINATION DEVICE FOR VEHICLE WHEEL

CROSS-REFERENCE TO RELATED APPLICATION

This application claims priority to Japanese Patent Application No. 2021-038286 filed on Mar. 10, 2021, incorporated herein by reference in its entirety.

BACKGROUND

1. Technical Field

The technology disclosed herein relates to defective product determination for a vehicle wheel.

2. Description of Related Art

Some vehicle wheels include a substantially cylindrical wheel rim and a substantially circular wheel disc fitted to an inner peripheral side of the wheel rim. As this type of vehicle wheel, there is known a vehicle wheel in which a wheel rim and a wheel disc are joined by arc welding. In the arc welding, the amount of heat input per unit area is relatively large. Therefore, thermal strain and residual stress are likely to occur in the vehicle wheel due to an excessive amount of input heat, thereby deforming the vehicle wheel.

There is known a vehicle wheel in which a wheel rim and a wheel disc are joined by laser welding (see, for example, Japanese Unexamined Patent Application Publication No. 5-329671 (JP 5-329671 A)). In the laser welding, the wheel rim and the wheel disc can be joined with a smaller amount of input heat than that in the arc welding. That is, in the laser welding, thermal deformation of the wheel rim and the wheel disc is smaller than that in the arc welding. Therefore, the fatigue strength is improved. Thus, the fitting length between the wheel rim and the wheel disc that is necessary to secure the fatigue strength can be reduced. As a result, it is possible to improve the dimensional accuracy of the vehicle wheel and reduce its weight in the laser welding.

The laser-welded vehicle wheel is required to have high durability to maintain traveling safety of the vehicle. In related art, for example, quality inspection after manufacture of vehicle wheels is conducted such that the durability of each vehicle wheel is evaluated by a radial load durability test and determination is made whether each vehicle wheel is a defective product based on an evaluation result.

SUMMARY

In the related-art defective product determination method for vehicle wheels, it is necessary to conduct the radial load durability test for all the manufactured vehicle wheels. Therefore, there has been a demand for a technology for efficiently performing defective product determination for the sequentially manufactured vehicle wheels.

This specification discloses a technology capable of solving the problem described above.

The technology disclosed herein can be realized in the following forms.

A first aspect of the present disclosure relates to a defective product determination method for a vehicle wheel. The defective product determination method for the vehicle wheel uses a defective product determination device. The defective product determination device includes a controller. The vehicle wheel includes a wheel rim and a wheel disc joined by radiating a laser beam to a boundary between the wheel rim and the wheel disc. The defective product determination method includes locating, as a locating step by the controller, a lowest point on a welding mark due to radiation of the laser beam within a target range from an inner peripheral surface of the wheel rim to a position spaced away by a specified distance inward in a radial direction of the vehicle wheel, and determining, as a determination step by the controller, that the vehicle wheel is a defective product when a defective product determination condition is satisfied. The defective product determination condition includes, as a necessary condition, a condition that a relative distance of the lowest point with respect to the inner peripheral surface of the wheel rim in the radial direction of the vehicle wheel is equal to or smaller than a reference distance.

The inventors have conducted extensive studies to newly find a correlation between the position of the lowest point on the welding mark due to laser welding in the target range and the durability of the vehicle wheel. That is, in the defective product determination method for the vehicle wheel, the vehicle wheel is determined as a defective product when the relative distance of the lowest point (an inner side in the radial direction is positive) with respect to the inner peripheral surface of the wheel rim in the radial direction of the vehicle wheel is equal to or smaller than the reference distance. According to the defective product determination method for the vehicle wheel, it is possible to screen out the defective vehicle wheel due to the durability based on the position of the lowest point on the welding mark due to laser welding.

In the defective product determination method for the vehicle wheel, the defective product determination condition may further include, as the necessary condition, a condition that a continuous lowest point is present. The continuous lowest point may be the lowest point having the relative distance equal to or smaller than the reference distance and continuous over a reference length or larger in a circumferential direction of the vehicle wheel.

For example, depending on the shape of the vehicle wheel or the determination accuracy required in the defective product determination for the vehicle wheel, when the lowest point having the relative distance equal to or smaller than the reference distance is present and the length of the lowest point is relatively small, the determination that the vehicle wheel is a defective product should not be made based only on that fact. In the defective product determination method for the vehicle wheel, the defective product determination condition further includes, as the necessary condition, the condition that the continuous lowest point is present. The continuous lowest point is a portion of the welding mark where the lowest point having the relative distance equal to or smaller than the reference distance is continuous over the reference length or larger in the circumferential direction of the vehicle wheel. According to the defective product determination method for the vehicle wheel, it is possible to reduce the occurrence of a case where the vehicle wheel is erroneously determined as a defective product based only on the fact that the lowest point is present locally.

In the defective product determination method for the vehicle wheel, the defective product determination condition may further include, as the necessary condition, a condition that a total length of the continuous lowest point is equal to or larger than a reference ratio of a joining length between the wheel rim and the wheel disc.

For example, depending on the shape of the vehicle wheel or the determination accuracy required in the defective product determination for the vehicle wheel, when the continuous lowest point is present and the total length of the continuous lowest point is relatively small, the determination that the vehicle wheel is a defective product should not be made based only on that fact. In the defective product determination method for the vehicle wheel, the defective product determination condition further includes, as the necessary condition, the condition that the total length of the continuous lowest point is equal to or larger than the reference ratio of the joining length between the wheel rim and the wheel disc. According to the defective product determination method for the vehicle wheel, it is possible to reduce the occurrence of a case where the vehicle wheel is erroneously determined as a defective product based only on the fact that the continuous lowest point is present.

A second aspect of the present disclosure relates to a non-transitory storage medium. The non-transitory storage medium stores instructions that are executable by one or more processors and that cause the one or more processors to perform functions. The functions include locating, as a locating process, a lowest point on a welding mark due to radiation of a laser beam within a target range from an inner peripheral surface of a wheel rim to a position spaced away by a specified distance inward in a radial direction of a vehicle wheel. The vehicle wheel includes the wheel rim and a wheel disc joined by radiating the laser beam to a boundary between the wheel rim and the wheel disc. The functions include determining, as a determination process, that the vehicle wheel is a defective product when a defective product determination condition is satisfied. The defective product determination condition includes, as a necessary condition, a condition that a relative distance of the lowest point with respect to the inner peripheral surface of the wheel rim in the radial direction of the vehicle wheel is equal to or smaller than a reference distance. According to the structure described above, it is possible to screen out the defective vehicle wheel due to the durability based on the position of the lowest point on the welding mark due to laser welding.

A third aspect of the present disclosure relates to a defective product determination device for a vehicle wheel. The vehicle wheel includes a wheel rim and a wheel disc joined by radiating a laser beam to a boundary between the wheel rim and the wheel disc. The defective product determination device includes a controller. The controller is configured to locate a lowest point on a welding mark due to radiation of the laser beam within a target range from an inner peripheral surface of the wheel rim to a position spaced away by a specified distance inward in a radial direction of the vehicle wheel. The controller is configured to determine that the vehicle wheel is a defective product when a defective product determination condition is satisfied. The defective product determination condition includes, as a necessary condition, a condition that a relative distance of the lowest point with respect to the inner peripheral surface of the wheel rim in the radial direction of the vehicle wheel is equal to or smaller than a reference distance. According to the structure described above, it is possible to screen out the defective vehicle wheel due to the durability based on the position of the lowest point on the welding mark due to laser welding.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is an explanatory diagram illustrating a schematic structure of a defective product determination system 50 for the steel wheel 100.

DETAILED DESCRIPTION OF EMBODIMENTS

Structure of Vehicle Steel Wheel 100

Figure 1:
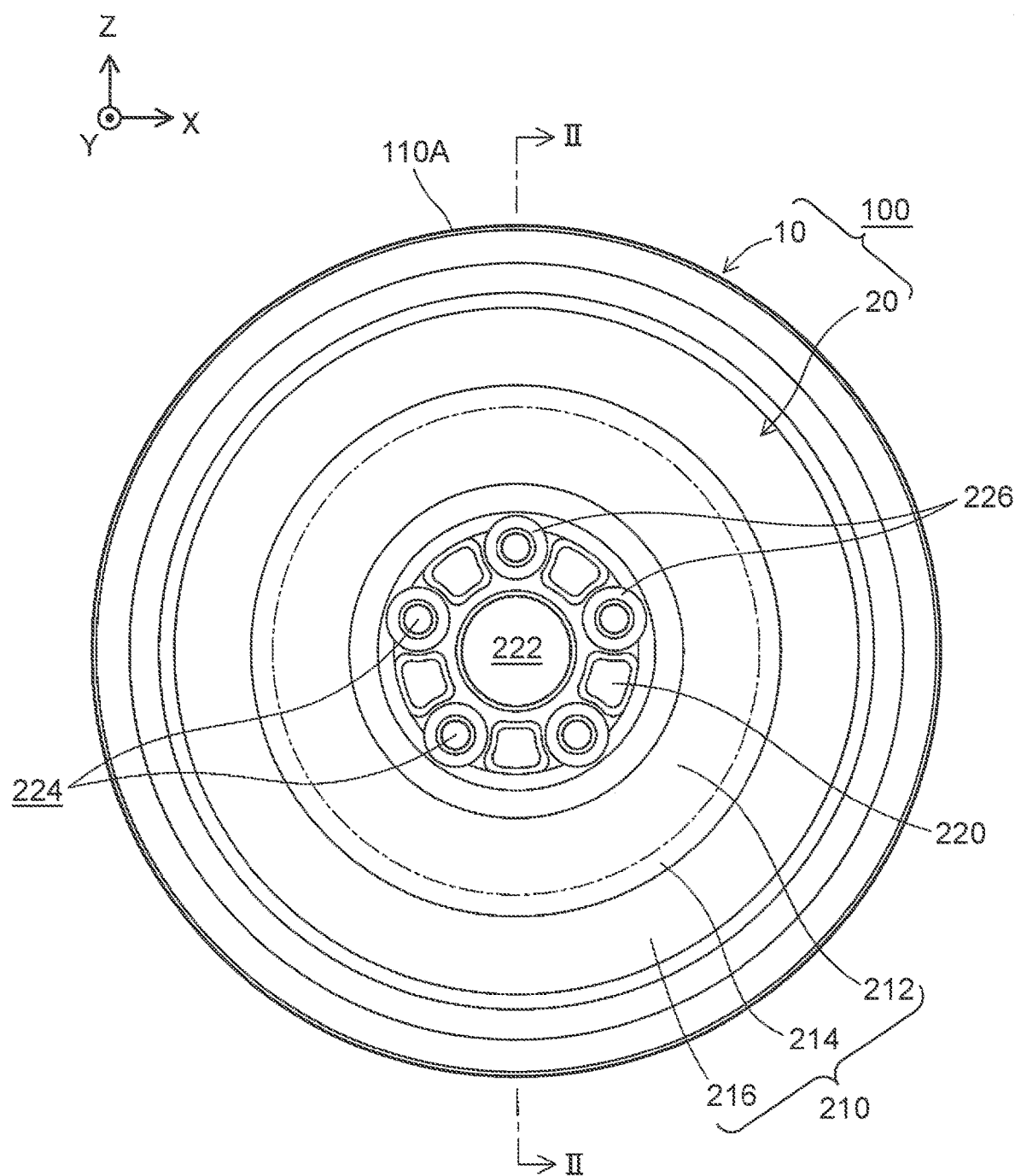
FIG. 1 is an XZ plan schematically illustrating an appearance structure of a front side of a steel wheel 100 of an embodiment.
Figure 2:
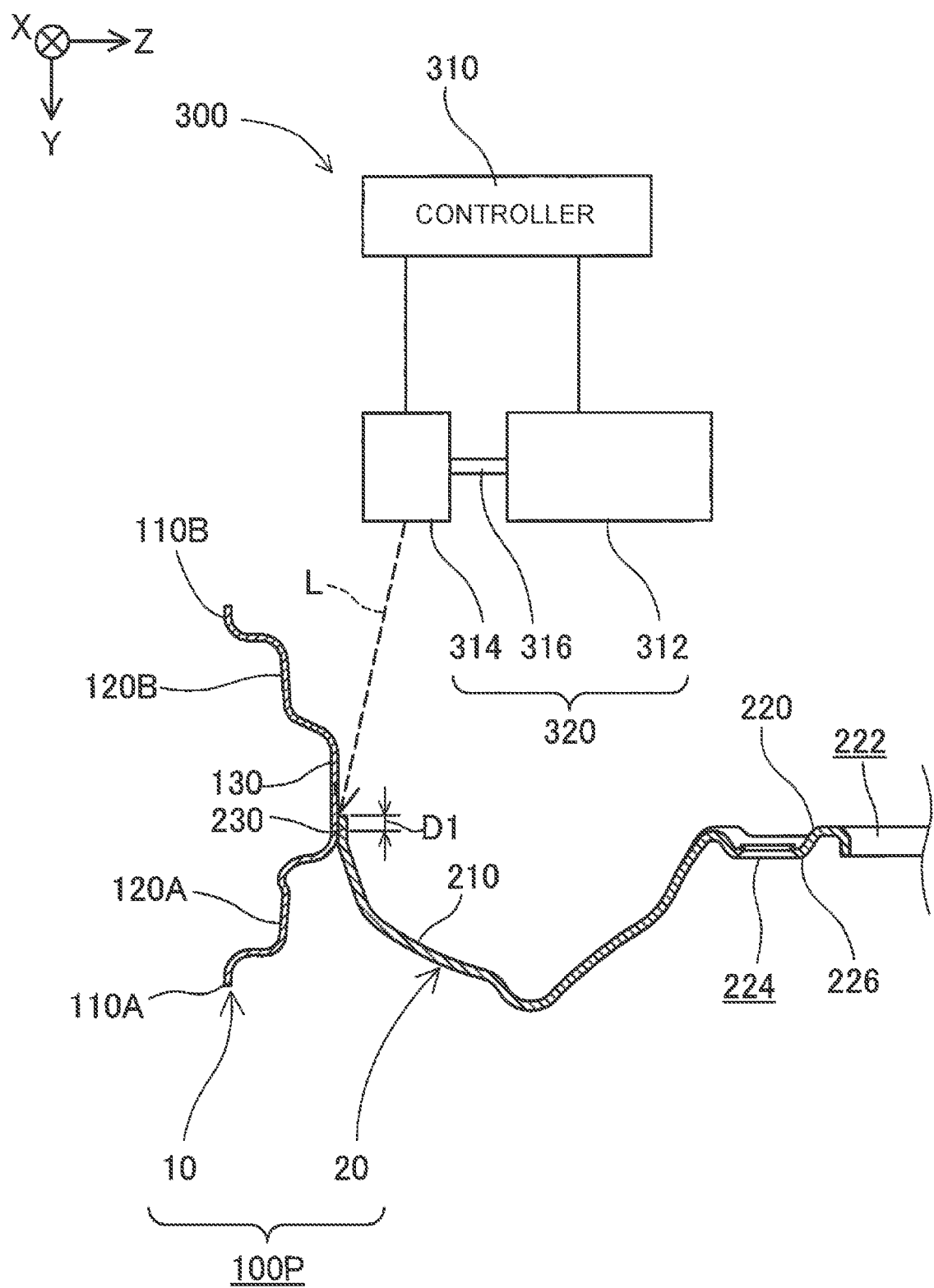
FIG. 2 is an explanatory diagram illustrating a part of a manufacturing process for the steel wheel 100.

FIG. 1 is an XZ plan schematically illustrating an appearance structure of a front side of a vehicle steel wheel (hereinafter referred to as "steel wheel") 100 of the present embodiment. FIG. 2 is an explanatory diagram illustrating a part of a manufacturing process for the steel wheel 100. FIG. 2 illustrates a laser welding device 300 and a part of the steel wheel 100. The part of the steel wheel 100 is illustrated in a YZ sectional structure at a position II-II in FIG. 1. Each figure illustrates X, Y, and Z axes orthogonal to each other to determine directions. For convenience herein, a Y-axis direction is a direction parallel to a rotation axis of the steel wheel 100, and is hereinafter referred to as "wheel axial direction", but the steel wheel 100 may actually be arranged in a direction different from such a direction. A radial direction of the steel wheel 100 is referred to as "wheel radial direction", and a circumferential direction about the rotation axis of the steel wheel 100 is referred to as "wheel circumferential direction". The same applies to FIG. 3 and other subsequent figures. The steel wheel 100 is an example of "vehicle wheel" in the claims.

The steel wheel 100 includes a substantially cylindrical wheel rim 10, a substantially circular wheel disc 20 fitted to an inner peripheral side of the wheel rim 10, and a laser-welded portion 30 where the wheel rim 10 and the wheel disc 20 are joined by laser welding (see FIG. 4 described later). The steel wheel 100 of the present embodiment is a so-called two-piece type steel wheel in which the wheel rim 10 and the wheel disc 20 are provided separately. One side of the steel wheel 100 in the wheel axial direction (positive Y-axis side that is a front side of the steel wheel 100) is hereinafter referred to as "outer side". The other side of the steel wheel 100 in the wheel axial direction (negative Y-axis side that is a back side of the steel wheel 100) is hereinafter referred to as "inner side". When the steel wheel 100 is mounted on a vehicle body (not illustrated), the outer side of the steel wheel 100 is opposite to the vehicle body, and the inner side of the steel wheel 100 is a vehicle body side. The outer surface of the steel wheel 100 is a design surface.

As illustrated in FIG. 2, the wheel rim 10 includes a pair of flange portions 110A and 110B, a pair of bead seat portions 120A and 120B, and a drop portion 130.

The flange portions 110A and 110B are substantially annular when viewed in the wheel axial direction (Y-axis direction), and are positioned at both ends of the wheel rim 10 in the wheel axial direction. The flange portions 110A and 110B hold a tire (not illustrated) attached to the steel wheel 100 without displacement in the wheel axial direction.

The bead seat portions 120A and 120B are arranged between the flange portions 110A and 110B in the wheel axial direction (Y-axis direction). Specifically, the bead seat portion 120A on the outer side adjoins the inner side of the flange portion 110A on the outer side. The bead seat portion 120B on the inner side adjoins the outer side of the flange portion 110B on the inner side. Each of the bead seat portions 120A and 120B has an outer peripheral surface substantially parallel to the wheel axial direction, and the tire is supported by contact of a bead portion of the tire with the outer peripheral surface.

The drop portion 130 is arranged between the bead seat portions 120A and 120B in the wheel axial direction (Y-axis direction). The drop portion 130 has a shape recessed inward in the wheel radial direction with respect to the bead seat portions 120A and 120B when viewed in the wheel circumferential direction. Therefore, a groove (drop well) is formed on an outer peripheral side of the drop portion 130. Since this groove is formed in the wheel rim 10, the tire can easily be attached to and detached from the steel wheel 100.

As illustrated in FIGS. 1 and 2, the wheel disc 20 includes a hat portion 210, a hub attachment portion 220, and a disc flange portion 230.

The hub attachment portion 220 has a substantially circular shape, and is positioned substantially at the center of the wheel disc 20 when viewed in the wheel axial direction (Y-axis direction). A hub hole 222 to which a hub (not illustrated) of the vehicle body is coupled is formed substantially at the center of the hub attachment portion 220. Around the hub hole 222, a plurality of (five in FIG. 1) bearing surfaces 226 is arranged at equal intervals in the wheel circumferential direction (see FIG. 1).

A bolt hole 224 into which a fastening member (not illustrated) is inserted is formed through each bearing surface 226. Specifically, in the present embodiment, the bolt hole 224 of the bearing surface 226 is open so that the diameter increases toward the outer side. A peripheral portion of the bolt hole 224 of each bearing surface 226 projects toward the outer side. Specifically, a peripheral portion of the bearing surface 226 is inclined so that the diameter increases toward the inner side.

In the present embodiment, the fastening member includes, for example, a nut member having an internal thread and arranged on the outer side of the bolt hole 224 in the steel wheel 100, and a serration bolt having an external thread and arranged on the inner side of the bolt hole 224 in the steel wheel 100. The fastening member may include a hub bolt having an external thread and a bearing surface and arranged on the outer side of the bolt hole 224 in the steel wheel 100, and a hub having an internal thread. The fastening member may have another fastening structure (press-fitting structure or the like) instead of the threaded engagement members such as a nut member and a bolt.

The outer peripheral surface of the peripheral portion of the bolt hole 224 in each bearing surface 226 is a tapered surface whose outside diameter decreases toward the bolt hole 224. When the hub attachment portion 220 is coupled to the vehicle body by fastening with the fastening member, a part of the fastening member (for example, the head of the bolt or the nut) is seated on the peripheral portion of the bolt hole 224 in the bearing surface 226.

The disc flange portion 230 has a substantially annular shape when viewed in the wheel axial direction (Y-axis direction), and is positioned on the outer peripheral edge of the wheel disc 20. The outer peripheral surface of the disc flange portion 230 is fitted to the inner peripheral surface of the drop portion 130 of the wheel rim 10 (see FIG. 2). The length of the fitting portion (disc flange portion 230) between the wheel rim 10 and the wheel disc 20 in the wheel axial direction is a "fitting length D1" between the wheel rim 10 and the wheel disc 20.

The hat portion 210 is an annular portion positioned between the hub attachment portion 220 and the disc flange portion 230 and surrounding the hub attachment portion 220 when viewed in the wheel axial direction (Y-axis direction). The hat portion 210 is raised toward the outer side. Specifically, the hat portion 210 includes an inner peripheral portion 212, an apex portion 214, and an outer peripheral portion 216. The apex portion 214 has a substantially annular shape when viewed in the wheel axial direction, and is positioned on the outer side of the hub attachment portion 220 and the disc flange portion 230 in the wheel axial direction. The inner peripheral portion 212 has a substantially annular shape and positioned on an inner peripheral side of the apex portion 214 when viewed in the wheel axial direction. The inner peripheral portion 212 is inclined to rise toward the outer side with decreasing distance from the outer peripheral edge of the hub attachment portion 220 to the apex portion 214. The outer peripheral portion 216 has a substantially annular shape and positioned on an outer peripheral side of the apex portion 214 when viewed in the wheel axial direction. The outer peripheral portion 216 is inclined to rise toward the outer side with decreasing distance from the disc flange portion 230 to the apex portion 214.

The wheel disc 20 is positioned closer to the outer side of the wheel rim 10, and the outer peripheral surface of the wheel disc 20 (disc flange portion 230) is fitted to the inner peripheral surface of the drop portion 130 of the wheel rim 10 and is integrated by laser welding (for example, fillet welding in which a laser beam L is radiated to the vicinity of a boundary between the wheel rim 10 and the wheel disc 20 for welding). As a result, the laser-welded portion 30 is formed between the wheel rim 10 and the wheel disc 20 (see FIG. 4 described later). In the present embodiment, the laser-welded portion 30 is formed over the entire circumference or a part of the wheel disc 20.

Manufacturing Method for Steel Wheel 100

Figure 3:
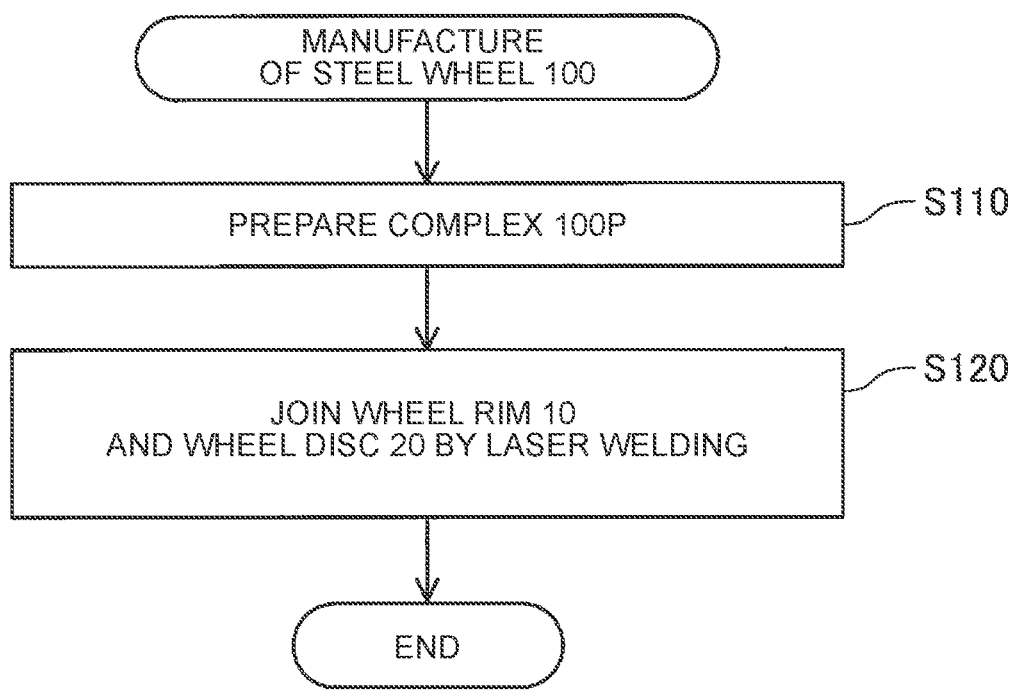
FIG. 3 is a flowchart illustrating a part of a manufacturing method for the steel wheel 100.

Next, a manufacturing method for the steel wheel 100 will be described. FIG. 3 is a flowchart illustrating a part of the manufacturing method for the steel wheel 100. As illustrated in FIG. 3, a preparatory step is first performed (S110) to prepare a complex 100P (see FIG. 2). The complex 100P is obtained by fitting the wheel disc 20 into the wheel rim 10, and is in a state before joining by laser welding. The wheel rim 10 can be manufactured, for example, by forming a flat steel plate. The wheel disc 20 can be manufactured, for example, by forming a flat steel plate.

Next, a laser welding step is performed (S120) to join the inner peripheral surface of the wheel rim 10 and the outer peripheral surface of the wheel disc 20 by laser welding. Specifically, the laser welding device 300 includes a controller 310 and a laser processor 320. The controller 310 includes a central processing unit (CPU) and a memory (not illustrated), and controls operations of the laser processor 320. The laser processor 320 is, for example, a head separation type in which a body 312 and a head 314 are connected to each other via an optical fiber 316. The body 312 includes a laser light source such as an yttrium aluminum garnet (YAG) laser oscillator or a carbon gas laser oscillator. The head 314 is connected to the body 312 via the optical fiber 316. The laser beam L emitted from the laser light source of the body 312 is transmitted to the head 314 via the optical fiber 316, and is radiated from the head 314 to a welding target portion of the composite 100P.

As illustrated in FIG. 2, for example, the complex 100P is held by a holding device (not illustrated) with its inner side facing upward, and is rotated about the wheel axis. The laser welding device 300 is positioned above the composite 100P, and the laser beam L from the head 314 is radiated to the vicinity of the boundary between the wheel rim 10 and the wheel disc 20 on the inner side of the steel wheel 100. As a result, the wheel rim 10 and the wheel disc 20 are joined by laser welding, and the steel wheel 100 is manufactured.

Principle of Defective Product Determination for Steel Wheel 100

Next, the principle of defective product determination for the steel wheel 100 will be described. The inventors have conducted extensive studies to newly find a target position of the laser beam L on the composite 100P and a correlation between a position of a lowest point 32 on a welding mark due to laser welding (also referred to as "welding bead" on the surface of the laser-welded portion 30) and the durability of the steel wheel 100. The lowest point 32 is a lowest point on the welding mark within a predetermined target range (with the inner side of the steel wheel 100 facing upward). The target range is a range from the inner peripheral surface of the wheel rim 10 to a position spaced away by a specified distance ΔDh inward in the wheel radial direction (to a positive Z-axis side in FIG. 2 and FIG. 4 described later). For example, the lowest point 32 may be a portion of the welding mark that is formed on the wheel disc 20 side and recedes in the wheel axial direction (Y-axis direction).

Specifically, if the target position of the laser beam L on the composite 100P in the laser welding step (S120 in FIG. 3) varies in the wheel radial direction (Z-axis direction), the shape of the welding mark formed on the steel wheel 100 may vary and the welding mark may have the lowest point 32 (for example, a dent in the welding mark). As the target position of the laser beam L is farther from an inner peripheral surface 12 of the wheel rim 10 when viewed in the wheel axial direction, the lowest point 32 tends to be formed at a position closer to the inner peripheral surface 12. In other words, as a relative distance of the target position of the laser beam L with respect to the inner peripheral surface 12 in the wheel radial direction (hereinafter referred to as "relative laser distance", provided that the inner side in the wheel radial direction is positive) increases, a relative distance of the lowest point 32 with respect to the inner peripheral surface 12 (hereinafter referred to as "relative distance ΔD1 of lowest point 32", provided that the inner side in the wheel radial direction is positive) decreases (see FIG. 4 described later). When the relative distance ΔD1 of the lowest point 32 is equal to or smaller than a predetermined reference distance ΔDt, the durability of the steel wheel 100 decreases significantly.

The relationship between each of the relative laser position and the relative distance ΔD1 of the lowest point 32 and each of the durability and the breaking strength of the steel wheel 100 will be described taking specific examples. Due to circumstances such as manufacturing variations, it is difficult to join the wheel rim 10 and the wheel disc 20 while always keeping a constant relative laser distance. As a result, the relative laser distance may vary among a plurality of composites 100P, and the relative laser distance of one complex 100P may vary at a plurality of positions in the circumferential direction. FIG. 4 is an explanatory diagram schematically illustrating sectional structures in the vicinity of the laser-welded portions 30. FIG. 4 illustrates sectional structures of five samples S1 to S5 of the steel wheel 100 in the vicinity of the laser-welded portion 30 (portion X1 in FIG. 7 described later). The five samples S1 to S5 are manufactured under conditions different in the target position of the laser beam L in the laser welding step. That is, in the five samples S1 to S5, the relative laser distances are different from each other (see the relative laser distances in FIG. 4). The fact that the relative laser distance is a positive value means that the target position of the laser beam L is on the inner side in the wheel radial direction (positive Z-axis side closer to the center of the wheel disc 20) with respect to an approximate straight line L1 of the inner peripheral surface 12 in FIG. 4. The fact that the relative laser distance is a negative value means that the target position of the laser beam L is on the outer side in the wheel radial direction (negative Z-axis side closer to the wheel rim 10) with respect to the approximate straight line L1. The reference distance ΔDt can be determined based on, for example, a result of a radial load durability test. In the present embodiment, the reference distance ΔDt is, for example, +0.3 mm.

Figure 4:
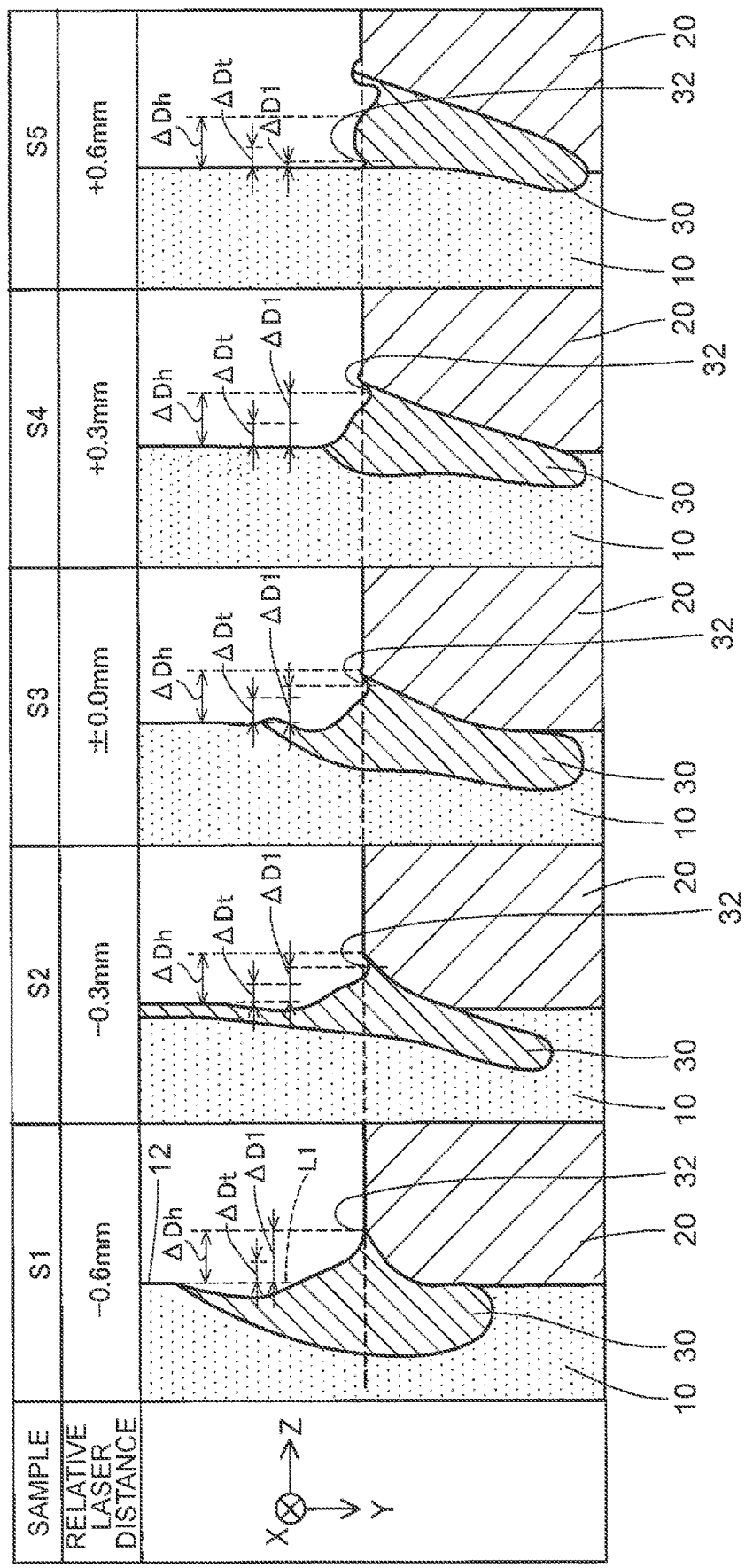
FIG. 4 is an explanatory diagram schematically illustrating sectional structures in the vicinity of laser-welded portions 30.

As illustrated in FIG. 4, in the sample S1, the relative laser distance is −0.6 mm, and the relative distance ΔD1 of the lowest point 32 substantially agrees with the specified distance ΔDh and is larger than the reference distance ΔDt. In the sample S2, the relative laser distance is −0.3 mm, and the relative distance ΔD1 of the lowest point 32 is slightly larger than the reference distance ΔDt (+0.3 mm). In the sample S3, the relative laser distance is substantially zero, and the relative distance ΔD1 of the lowest point 32 is slightly larger than the reference distance ΔDt. In the sample S4, the relative laser distance is +0.3 mm, and the relative distance ΔD1 of the lowest point 32 is slightly larger than the reference distance ΔDt. In the sample S5, the relative laser distance is +0.6 mm, and the relative distance ΔD1 of the lowest point 32 is smaller than the reference distance ΔDt.

Figure 5:
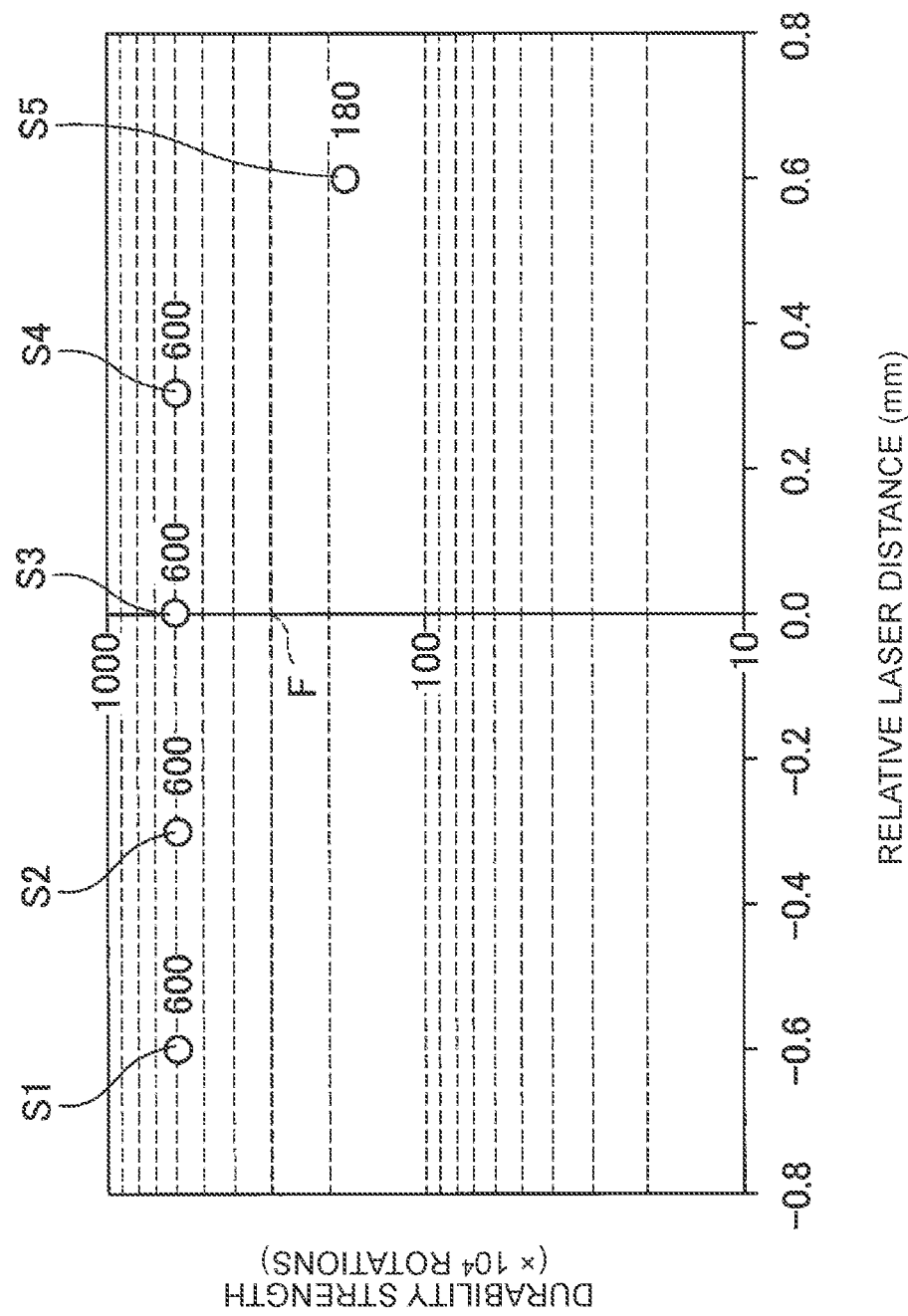
FIG. 5 is a graph illustrating a relationship between a durability of the steel wheel 100 and a relative laser distance.
Figure 6:
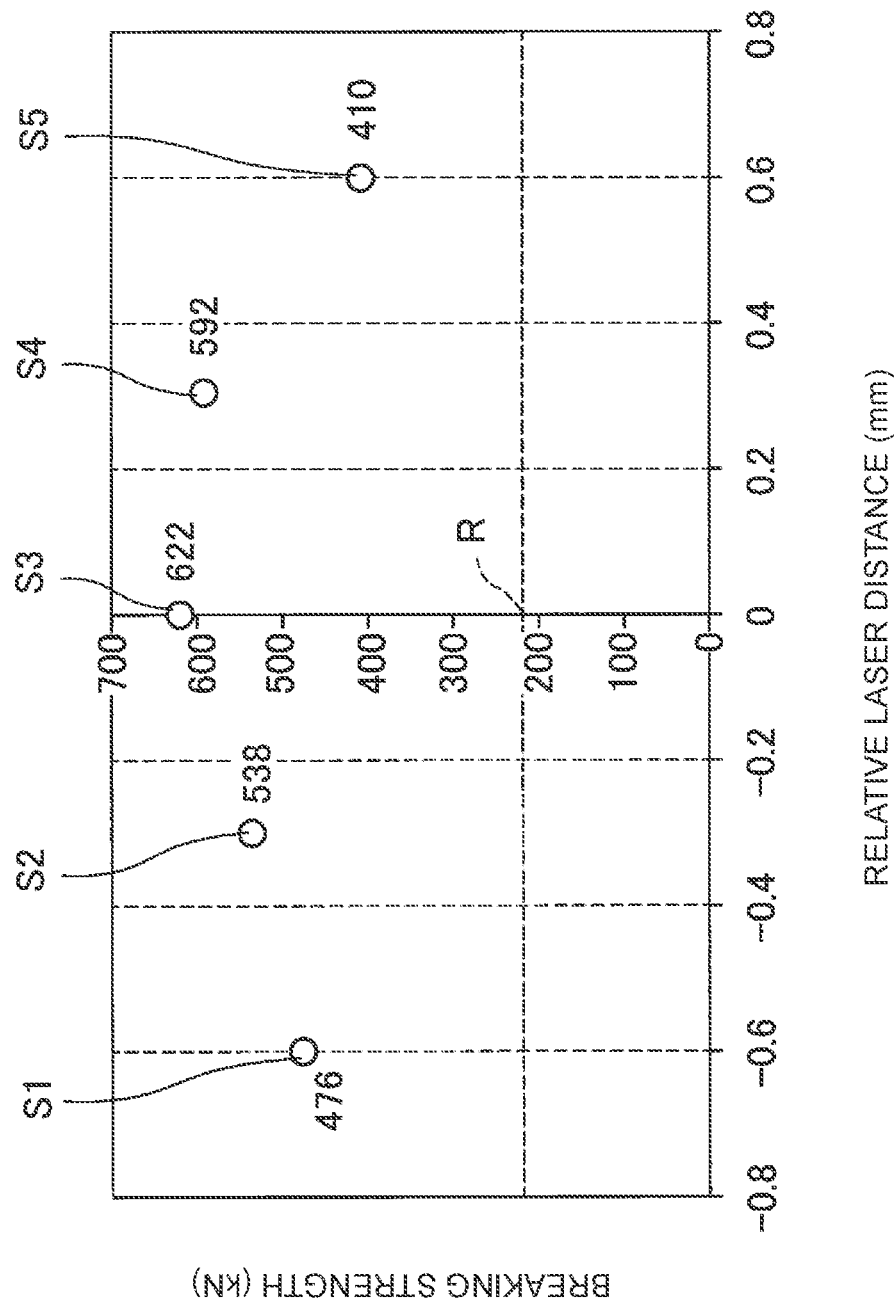
FIG. 6 is a graph illustrating a relationship between a breaking strength of the steel wheel 100 and the relative laser distance.

FIG. 5 is a graph illustrating a relationship between the durability of the steel wheel 100 and the relative laser distance. FIG. 6 is a graph illustrating a relationship between the breaking strength of the steel wheel 100 and the relative laser distance. The durability herein means a durability evaluated by a radial load durability test defined under JIS D 4103. The breaking strength herein means a load when the laser-welded portion 30 or any other portion breaks by applying a force to the wheel disc 20 in the wheel axial direction with the wheel rim 10 fixed. The horizontal axis in FIGS. 5 and 6 is the relative laser distance (mm). The vertical axis in FIG. 5 is the durability strength (unit: $10^4$ rotations) that is a rotation speed until the steel wheel 100 is cracked or deformed in the radial load durability test. The vertical axis in FIG. 6 is the breaking strength (kN) of the steel wheel 100.

According to FIG. 5, in the durability evaluation, the durability strengths of the samples S1 to S4 are higher than a predetermined durability reference F, but the durability strength of the sample S5 is significantly lower than the predetermined durability reference F. This means that, when the relative laser distance is equal to or larger than a predetermined upper limit distance (+0.6 mm in the example of FIG. 4), the relative distance ΔD1 of the lowest point 32 is equal to or smaller than the reference distance ΔDt, and the durability of the steel wheel 100 decreases significantly. According to FIG. 6, in the breaking strength evaluation, the breaking strengths of all the samples S1 to S5 are higher than a predetermined strength reference R. The breaking strength of the sample S2 is lower than the breaking strengths of the samples S3 and S4. The breaking strengths of the samples S1 and S5 are even lower than the breaking strength of the sample S2. The evaluation results in FIG. 6 mean that, when the relative laser distance is larger than the upper limit distance, the breaking strength decreases in addition to the durability of the steel wheel 100. According to the evaluation results of the samples S1 and S2, it is considered that, when the relative laser distance is equal to or smaller than a predetermined lower limit distance (−0.3 mm in the example of FIG. 4), the dent in the welding mark is present closer to the inner peripheral surface 12 of the wheel rim 10 (see FIG. 4) and the breaking strength of the steel wheel 100 decreases.

According to the defective product determination method of the present embodiment described above, determination can be made as to whether the manufactured steel wheel 100 is a defective product that does not have desired performance (durability and breaking strength) based on the position of the lowest point 32 on the welding mark due to laser welding. For example, the defective product determination method of the present embodiment is first executed for each of the manufactured steel wheels 100, and then a higher-accuracy defective product determination method (for example, the radial load durability test) is executed for only the steel wheels 100 that are not determined as defective products. As a result, the burden of quality inspection for the steel wheel 100 (man-hours, time, cost, and the like) can be reduced.

Structure for Defective Product Determination for Steel Wheel 100

FIG. 7 is an explanatory diagram illustrating a schematic structure of a defective product determination system 50 for the steel wheel 100. For example, the defective product determination system 50 determines whether the manufactured steel wheels 100 are defective products by sequentially performing visual inspection for the steel wheels 100 in a quality inspection process on a production line. As illustrated in FIG. 7, the defective product determination system 50 includes an information processing device 500, an imaging unit 600, and the holding device described above. The information processing device 500 is an example of "defective product determination device" in the claims.

The information processing device 500 includes a controller 510, a storage 520, a display 530, an operation inputter 540, and an interface 550. These parts are communicably connected to each other via a bus 560.

For example, the display 530 is a liquid crystal display, and displays various images and various types of information. For example, the operation inputter 540 includes a keyboard, a mouse, buttons, and a microphone, and receives human operations and instructions. In the present embodiment, the display 530 includes a touch panel to function as the operation inputter 540. For example, the interface 550 includes a local area network (LAN) interface and a universal serial bus (USB) interface, and communicates with other devices (imaging unit 600 and the like) by wire or by wireless.

For example, the storage 520 includes a read-only memory (ROM), a random-access memory (RAM), and a hard disk drive (HDD), and is used for storing various types of data and programs and as a work area for execution of various programs and as a temporary data storage area. Specifically, the storage 520 stores a defective product determination program (PGM) 522. The defective product determination PGM 522 is a computer program for executing a process of determining whether the steel wheel 100 is a defective product (defective product determination process described later).

For example, the controller 510 includes a CPU, and controls operations of the information processing device 500 by executing a computer program read from the storage 520. For example, the controller 510 reads and executes the defective product determination PGM 522 in the storage 520 to execute the defective product determination process described later. The controller 510 functions as a locator 512 and a determiner 514 when executing the defective product determination process. The functions of these parts will be described in accordance with the description of various processes described later.

The imaging unit 600 (for example, a three-dimensional (3D) digital camera) can acquire a three-dimensional captured image of a surface shape of a subject by, for example, an optical cutting method. The imaging unit 600 is arranged at a position where the vicinity of the welding mark on the steel wheel 100 held by the holding device can be imaged. The imaging unit 600 sequentially images the welding marks on the steel wheel 100 rotated by the holding device at predetermined pitch intervals over the entire circumference. Pieces of captured image data on the welding marks at a plurality of points (for example, 6,400 points) imaged by the imaging unit 600 are sequentially stored in the storage 520 via the interface 550 of the information processing device 500.

Figure 8:
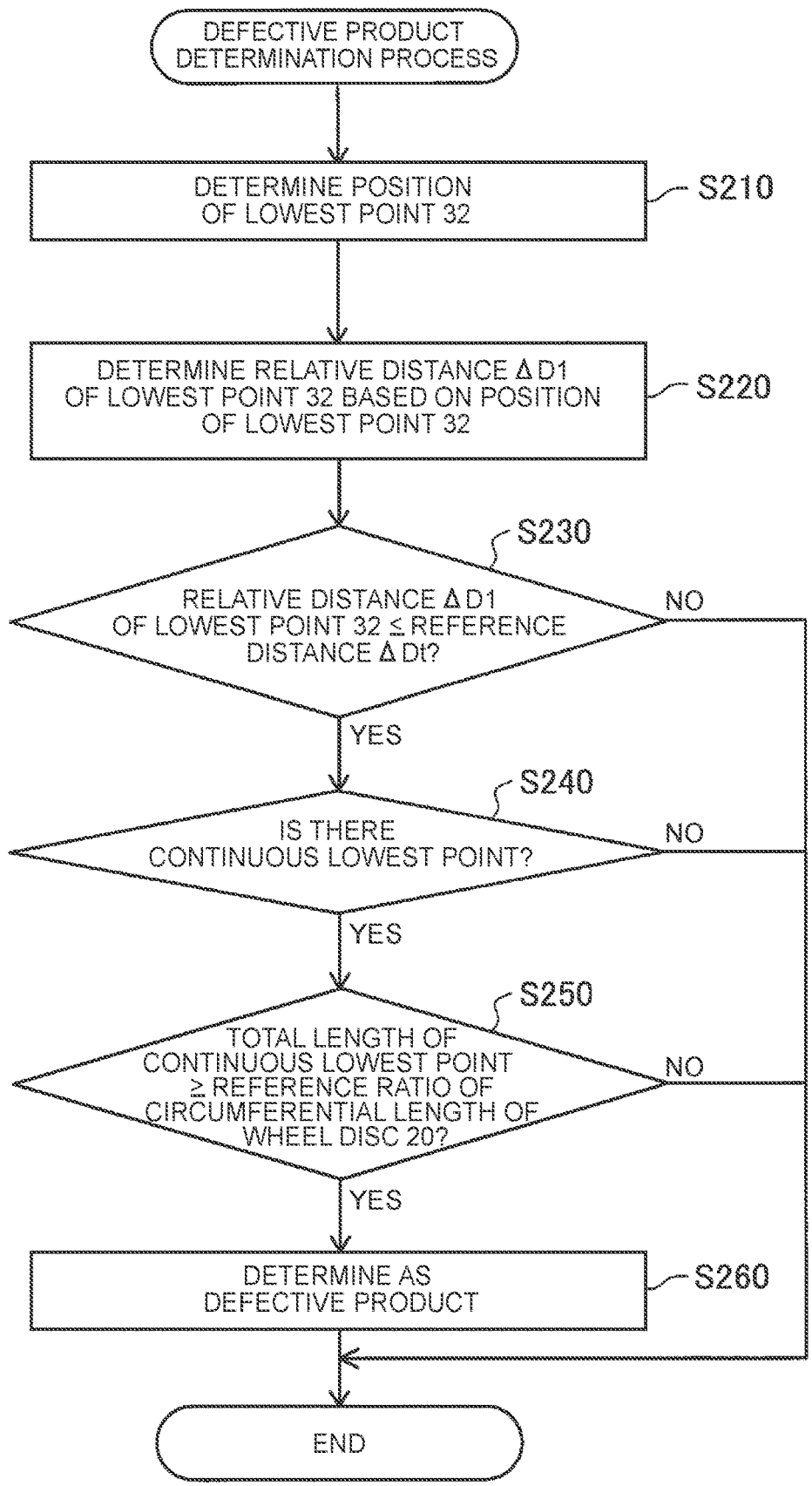
FIG. 8 is a flowchart illustrating details of a defective product determination process.

FIG. 8 is a flowchart illustrating details of the defective product determination process. When the defective product determination process is started, the locator 512 locates the lowest point 32 on the welding mark as illustrated in FIG. 8. Specifically, the locator 512 determines a position of the lowest point 32 on the welding mark based on the captured image data at each point on the steel wheel 100 (S210). S210 is an example of "locating step" and "locating process" in the claims.

More specifically, the locator 512 measures a height difference of the shape of the welding mark based on the captured image data, and locates the lowest point 32 within the target range described above based on a measurement result (with the inner side of the steel wheel 100 facing upward) (S210). For example, the specified distance ΔDh in the target range is preferably 90% or less of the width of the welding mark (bead width) in the wheel radial direction, and more preferably 60% or less of the width of the welding mark. In the present embodiment, the specified distance ΔDh is, for example, 0.7 mm. By setting this specified distance ΔDh, it is possible to reduce, for example, the occurrence of a case where the original shape of the steel wheel 100 is erroneously determined as the lowest point 32 (dent in the welding mark).

Next, the defective product determination PGM 522 determines whether a defective product determination condition is satisfied based on a locating result from the locator 512. When determination is made that the defective product determination condition is satisfied, the steel wheel 100 is determined as a defective product (S220 to S260). S220 to S260 are examples of "determination step" and "determination process" in the claims.

Specifically, when the position of the lowest point 32 is determined in S210, the determiner 514 calculates a relative distance of the position of the lowest point 32 with respect to the inner peripheral surface 12 of the wheel rim 10, and determines the relative distance as the relative distance ΔD1 of the lowest point 32 (S220). Next, the determiner 514 determines whether a first condition that the relative distance ΔD1 of the lowest point 32 is equal to or smaller than the reference distance ΔDt is satisfied (S230). When the determiner 514 determines that the first condition is satisfied (S230: YES), the determiner 514 determines whether a second condition that a continuous lowest point is present is satisfied based on, for example, the captured image data on the entire circumference of the steel wheel 100 (S240). The continuous lowest point is a portion where the lowest point 32 having the relative distance ΔD1 equal to or smaller than the reference distance ΔDt is continuous over a reference length (for example, 5 mm) or larger in the wheel circumferential direction. When the determiner 514 determines that the second condition is satisfied (S240: YES), the determiner 514 determines whether a third condition that the total length of the continuous lowest point is equal to or larger than a reference ratio of a joining length between the wheel rim 10 and the wheel disc 20 (for example, 60%) is satisfied (S250). The joining length between the wheel rim 10 and the wheel disc 20 is the total length of a joining (welding) portion between the wheel rim 10 and the wheel disc 20 in the wheel circumferential direction. In the present embodiment, the wheel rim 10 and the wheel disc 20 are joined over the entire circumference of the wheel disc 20. Therefore, the joining length between the wheel rim 10 and the wheel disc 20 is equal to the length of the entire circumference of the wheel disc 20. In a structure in which the wheel rim 10 and the wheel disc 20 are joined at a plurality of joining portions positioned away from each other in the wheel circumferential direction, the joining length between the wheel rim 10 and the wheel disc 20 is the sum of the lengths of the welding portions in the wheel circumferential direction. When the determiner 514 determines that the third condition is satisfied (S250: YES), the currently inspected steel wheel 100 is determined as a defective product because the durability is lower than the durability reference F (S260), and the defective product determination process is terminated.

When the determiner 514 determines that any one of the first to third conditions is not satisfied (S230: NO, S240: NO, or S250: NO), the determiner 514 terminates the defective product determination process without determining that the steel wheel 100 is a defective product.

Effects of Embodiment

In the defective product determination method for the steel wheel 100 according to the present embodiment described above, the steel wheel 100 is determined as a defective product (S260) when the defective product determination condition including the necessary condition that the relative distance ΔD1 of the lowest point 32 is equal to or smaller than the reference distance ΔDt (first condition) is satisfied (S230: YES, S240: YES, and S250: YES in FIG. 8). According to the present embodiment, it is possible to screen out the defective steel wheel 100 due to the durability based on the position of the lowest point 32 on the welding mark due to laser welding.

For example, depending on the shape of the steel wheel 100 or the determination accuracy required in the defective product determination for the steel wheel 100, when the lowest point 32 is present and the length of the lowest point 32 is relatively small, the determination that the steel wheel 100 is a defective product should not be made based only on that fact. In the present embodiment, the defective product determination condition further includes, as the necessary condition, the condition that the continuous lowest point is present (second condition) (see S240 in FIG. 8). According to the present embodiment, it is possible to reduce the occurrence of a case where the steel wheel 100 is erroneously determined as a defective product based only on the fact that the lowest point 32 is present locally.

For example, depending on the shape of the steel wheel 100 or the determination accuracy required in the defective product determination for the steel wheel 100, when the continuous lowest point is present and the total length of the continuous lowest point is relatively small, the determination that the steel wheel 100 is a defective product should not be made based only on that fact. In the present embodiment, the defective product determination condition further includes, as the necessary condition, the condition that the total length of the continuous lowest point is equal to or larger than the reference ratio of the joining length between the wheel rim 10 and the wheel disc 20 (third condition) (see S250 in FIG. 8). According to the present embodiment, it is possible to reduce the occurrence of a case where the steel wheel 100 is erroneously determined as a defective product based only on the fact that the continuous lowest point is present.

The technology disclosed herein is not limited to the embodiment described above, and may be modified into various forms without departing from the gist of the technology. For example, the following modifications are possible.

The structure of the steel wheel 100 in the embodiment described above is merely an example and may be modified variously. For example, the steel wheel 100 to be inspected has the structure in which the wheel rim 10 and the wheel disc 20 are laser-welded over the entire circumference, but may have a structure in which the wheel rim 10 and the wheel disc 20 are not partially welded in the circumferential direction.

In the embodiment described above, the two-piece type steel wheel 100 is exemplified as the vehicle wheel, but the vehicle wheel is not limited to this type of steel wheel. For example, the vehicle wheel may be a so-called three-piece type wheel including a wheel disc and a wheel rim including two components that are an outer rim and an inner rim, or may be a wheel other than the steel wheel (for example, an aluminum wheel).

The manufacturing method for the steel wheel 100 in the embodiment described above is merely an example and may be modified variously. For example, the defective product determination condition need not include at least one of the second condition and the third condition. Specifically, in FIG. 8, the determiner 514 need not execute at least one of the processes of S240 and S250. For example, when the determiner 514 determines that the first condition is satisfied (S230: YES), the determiner 514 may determine that the product is defective (S260), and terminate the defective product determination process.

What is claimed is:

1. A defective product determination method for a vehicle wheel using a defective product determination device, the defective product determination device including a controller, the vehicle wheel including a wheel rim and a wheel disc joined by radiating a laser beam to a boundary between the wheel rim and the wheel disc, the defective product determination method comprising:

locating, as a locating step by the controller, a lowest point on a welding mark due to radiation of the laser beam within a target range from an inner peripheral surface of the wheel rim to a position spaced away by a specified distance inward in a radial direction of the vehicle wheel; and determining, as a determination step by the controller, that the vehicle wheel is a defective product when a defective product determination condition is satisfied, the defective product determination condition including, as a necessary condition, a condition that a relative distance of the lowest point with respect to the inner peripheral surface of the wheel rim in the radial direction of the vehicle wheel is equal to or smaller than a reference distance.

2. The defective product determination method for the vehicle wheel according to claim 1, wherein the target range starts from the inner peripheral surface of the wheel rim and extends the specified distance toward a center of the vehicle wheel in the radial direction, with the specified distance being set to cover 60% or less of an overall width of the welding mark.

3. The defective product determination method for the vehicle wheel according to claim 1, wherein the target range starts from the inner peripheral surface of the wheel rim and extends the specified distance toward a center of the vehicle wheel in the radial direction, with the specified distance being 0.7 mm.

4. The defective product determination method for the vehicle wheel according to claim 1, wherein the defective product determination condition further includes, as the necessary condition, a condition that a continuous lowest point is present, the continuous lowest point being the lowest point having the relative distance equal to or smaller than the reference distance and continuous over a reference length or larger in a circumferential direction of the vehicle wheel.

5. The defective product determination method for the vehicle wheel according to claim 4, wherein the defective product determination condition further includes, as the necessary condition, a condition that a total length of the continuous lowest point is equal to or larger than a reference ratio of a joining length between the wheel rim and the wheel disc.

6. A non-transitory storage medium storing instructions that are executable by one or more processors and that cause the one or more processors to perform functions comprising:

locating, as a locating process, a lowest point on a welding mark due to radiation of a laser beam within a target range from an inner peripheral surface of a wheel rim to a position spaced away by a specified distance inward in a radial direction of a vehicle wheel, the vehicle wheel including the wheel rim and a wheel disc joined by radiating the laser beam to a boundary between the wheel rim and the wheel disc; and determining, as a determination process, that the vehicle wheel is a defective product when a defective product determination condition is satisfied, the defective product determination condition including, as a necessary condition, a condition that a relative distance of the lowest point with respect to the inner peripheral surface of the wheel rim in the radial direction of the vehicle wheel is equal to or smaller than a reference distance.

7. A defective product determination device for a vehicle wheel including a wheel rim and a wheel disc joined by radiating a laser beam to a boundary between the wheel rim and the wheel disc, the defective product determination device comprising a controller, wherein:

the controller is configured to locate a lowest point on a welding mark due to radiation of the laser beam within a target range from an inner peripheral surface of the wheel rim to a position spaced away by a specified distance inward in a radial direction of the vehicle wheel; and the controller is configured to determine that the vehicle wheel is a defective product when a defective product determination condition is satisfied, the defective product determination condition including, as a necessary condition, a condition that a relative distance of the lowest point with respect to the inner peripheral surface of the wheel rim in the radial direction of the vehicle wheel is equal to or smaller than a reference distance.

* * * * *